United States Patent Office 3,207,800
Patented Sept. 21, 1965

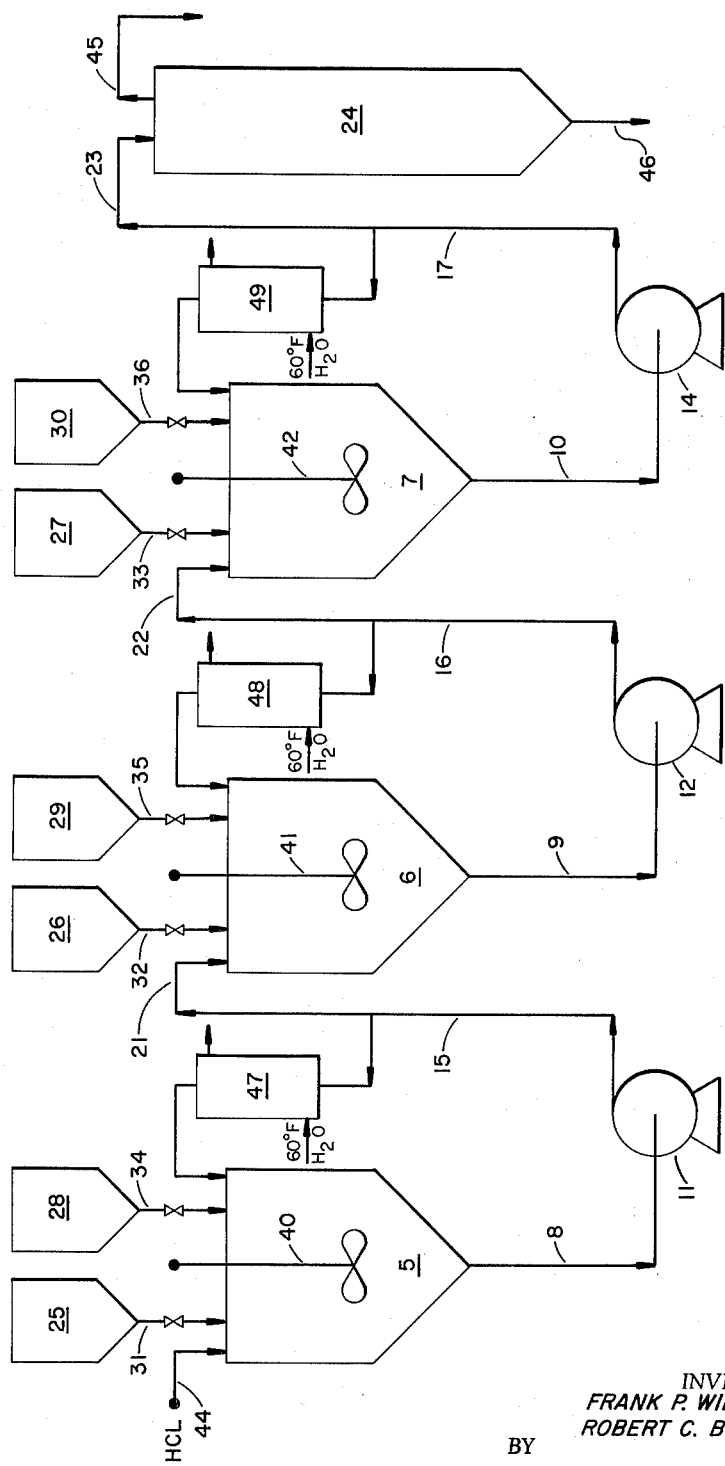

3,207,800
ALKYLATION PROCESS
Frank P. Williamson, Ellicott City, and Robert C. Bieneman, Baltimore, Md., assignors to Continental Oil Company, Ponca City, Okla., a corporation of Delaware
Filed May 3, 1962, Ser. No. 192,108
9 Claims. (Cl. 260—671)

This invention relates to an improved alkylation process. More particularly, the invention concerns a process for preparing high quality detergent alkaryls or alkylates which comprises alkylating a benzene in a plurality of communicating reaction zones arranged in series wherein a predominant amount of said aromatic reactant is introduced into the first of said zones and thence passed serially through the remaining zones and wherein proportional amounts of the alkylating agent, specifically an olefin, is parallelly fed together with an alkylation catalyst into each of the zones.

At present, there are two principal methods used in the manufacture of detergent alkaryls by the general process involving the alkylation of an aromatic compound with an alkylating agent. One of these methods is the batch method whereby the aromatic compound is charged to a suitable reactor and the alkylating agent and catalyst fed thereinto over a period of time. Another commercial method is based on the continuous alkylation of the aromatic compound with the alkylating agent. In the latter method, the aromatic compound, alkylating agent and catalyst are introduced separately and continuously into a suitable reactor, such rates of introduction of the individual components being adjusted so that a given external molecular ratio of aromatic compound to alkylating agent is continuously observed for the reaction system. Each of these methods has definite advantages as well as disadvantages. With regard to the batch process, it can be generally said that the highest quality of alkylate and attainment of maximum yields can be realized by this method. The method mainly suffers, however, in that a considerable amount of equipment is necessary to achieve high production rates. Additionally, while the quality of product resulting in the observance of the batch method is very good, variations are nevertheless experienced which necessitate troublesome blending operations in order to achieve a uniform final product meeting quality control standards. The continuous method as presently practiced, although it provides conveniently obtainable high production rates of alkylates of more or less uniform quality, yields an alkylate generally inferior in quality to that of the batch method.

As indicated in the summary of this invention stated above, the instant process is an improved continuous method whereby the alkylation reaction is carried out in a plurality of stages wherein the aromatic feed is passed serially therethrough and the alkylating agent is added in parallel flow to the various stages. We realize that multi-stage alkylation substantially corresponding in principle to the instant process has been practiced previously. This method of alkylation has heretofore been suggested as most useful in the production of gasoline and like materials. However, its utility in these prior art practices is predicated upon certain special conditions encountered therein. For example, there is a need for venting the reactors in this type of operation employing highly volatile materials and this requirement can be more effectively achieved when operating a multi-stage reaction system. Additionally, effective circulation rates of the particular alkylation catalysts used in such practices can be more readily facilitated in a multi-stage operation. In the production of detergent alkylates, however, neither of these problems is of significant concern especially when the preferred reactants and catalyst are used. The principal problem in making detergent alkylates is maintaining or producing a high quality product in maximum yields. Also it is necessary that the alkylate can be easily and economically recovered from the reaction mixture. The multi-stage alkylation process in accordance with this invention represents a continuous process whereby these desiderata were unpredictably realized. In retrospect, it can be seen how our process provides such beneficial results. The key to its success appears to lie in the inherent achievement of very high internal ratios of the aromatic compound to the alkylating agent throughout the reaction phase much in the same manner as is actually experienced in carrying out a batch operation. In a batch operation, the alkylating agent is added to a reaction sphere which in the initial stage of the reaction represents an almost infinite ratio of the aromatic compound to the said agent. As the alkylating agent is uniformly added, this ratio obviously assumes finite proportions, but due to the constant formation of alkylate it effectively remains much higher than that reflected by the overall composition of the final reaction mixture. Similarly, in our multi-stage process, one observes very high internal ratios of the aromatic compound to the alkylating agent throughout the reaction.

Before proceeding with a further discussion of the process conditions involved in the practice of this invention, a brief discussion will be given of the various reactants contemplated for use therein. The preferred aromatic compound is benzene. However, other lower alkyl substituted benzenes can be used such as, for example, toluene, xylene, ethylbenzene and the like.

A number of alkylating agents can likewise be used. These include the higher alkyl halides, alcohols and corresponding alkenes. Generally, it is preferred to use an olefinic type alkylating agent since these materials are readily available and comparatively inexpensive. The preferred types of olefinic material for use in the practice of this invention are the lower molecular weight unsaturated polymers derived by polymerizing propylene. These are generally highly branched chain materials containing from about 10–16 carbon atoms per molecule. Such olefinic products are either manufactured or sold in several grades, generally designated as dodecene, tridecene and pentadecene. As is well known in the art of detergent alkylate manufacture, when one refers to an olefin which is derived from polymerizing propylene as being, for example, dodecene, the connotation is not that the olefin is essentially such a compound. Rather the accepted meaning is that, while the olefinic material is predominantly composed of dodecene, it in addition contains a substantial portion of slightly higher and lower molecular weight olefins whose mean molecular weight nevertheless corresponds about to that of dodecene. This is so because as indicated, most of the currently available grades of olefins suitable for preparing detergent alkylates are derived by polymerizing propylene. Accordingly, these alkylating agents are a mixture of several chain length olefins as it is not known how to produce commercially a given polymer of propylene, say a tetramer, nor is it known how to selectively recover a given polymer from the polymerization reaction product. Therefore, the terms dodecene, tridecene and pentadecene as used herein and in the appended claims broadly contemplate complex mixtures of polymeric entities derived by the polymerization of propylene whose approximate various boiling range characteristics will be set forth hereinbelow.

Obviously, our invention is not limited to the use of olefinic alkylating agents obtained by polymerizing propylene. Equally applicable for use herein are the $C_{10}$–$C_{16}$ alpha olefins or mixtures thereof derived by growing aluminum triethyl or tripropyl in the presence of ethylene. Suitable alkylating agents can also be obtained by dimerizing the $C_5$–$C_8$ olefins readily available in certain petroleum cracking and coking operations. Similarly, the $C_{10}$–$C_{16}$ alkyl halides can be used. Such halides can be derived from any of the types of olefins hereinabove enumerated or from corresponding paraffins or mixtures thereof which can be separated from petroleum fractions rich in usch components, e.g., kerosene.

In alkylation reactions of the type herein concerned, it is necessary to employ an alkylation catalyst. Any of the Friedel-Crafts catalysts are suitable for this purpose, however, it is preferred to use in the practice of this invention aluminum chloride as the catalyst. While the aforesaid halide can be used as such, we prefer to use it in combination with a catalyst sludge, that is, the solid sludge which is separated from an alkylation reaction mixture employing aluminum chloride as the catalyst. Such a sludge is a mixture of complexes between the various reactants and products formed in the alkylation reaction. The sludge itself has a definite catalytic promoting potential, however, it is usually desirable to enrich the sludge with fresh aluminum chloride. This enrichment can be accomplished by adding to the sludge from about 1–5% and more preferably from about 1–3% of fresh aluminum chloride. Where it is desired to employ aluminum chloride alone as the alkylation catalyst, a suitable amount ranges from about 3–6% based on the amount of olefin introduced into the reaction system, When using enriched sludge as the catalyst, suitable amounts thereof range from about 10–100 weight percent or more of the olefinic alkylating agent. Preferred amounts of sludge range between about 50–100 weight percent of the alkylating agent. The enriched sludge may be added to the reaction system separately or in combination with the olefin. The catalyst, whether $AlCl_3$ or enriched sludge, can be promoted with small additions of conventional promoters, e.g., water, hydrochloric acid, etc.

In the implementation of this invention, a plurality of alkylation stages are used. In order to obtain optimum results, at least three stages are to be used. Our process can be carried out in two stages and some beneficial results noted. However, the process is considerably less effective than when at least three stages are employed. More than three stages can be used but it has been found that in the preparation of detergent alkylates such an elaborate system is not required to achieve the objectives contemplated herein.

As indicated previously, substantially all of the aromatic compound, specifically benzene, is introduced into the first stage or reaction zone. It accordingly is preferred to introduce at least 90% of the benzene into the first reaction zone. The balance, if any, can be introduced into the second and third stages in varying or equal quantities. If desired, the remainder may also be fed entirely into the second or any of the subsequent stages. Therefore, it can be seen that the bulk of the benzene fed to the reaction system in accordance with this invention passes serially through the total of the stages employed.

Proportional amounts of the olefinic alkylating agent are added to the individual alkylation zones or stages preferably together with the alkylation catalyst. The total amount of olefin introduced into the system can be divided up so that an equal amount is added to each stage. However, this suggested mode of uniform addition can be varied somewhat. For example, when employing the preferred system of three alkylation stages, 30–50% of the olefin feed can be charged to the first stage and from about 25–35% thereof to each of the other two stages.

The benzene and olefin introduced into the reaction system as described hereinabove are reacted together at a temperature between about 60–150° F. and preferably from about 80–130° F. It is desirable that the reaction mixture in each of the stages be stirred at a suitable rate. Mixing is relatively important in so far as it has the effect of increasing the apparent ratio of benzene to olefin thereby increasing the rate of alkylation and additionally improving the quality and yield of the alkylate. Mixing is obviously a relative concept and prescribed degrees thereof are difficult to define precisely. However, reference is made to Patent No. 2,941,051 wherein the degree of mixing is expressed as the ratio of circulation rate of the contents within the reactor in terms of volume per unit of time, usually gallons per minute, to the sum of the rates of introduction of reactants to the reactor. For example, in a three-stage process as contemplated herein, the reactants to the first stage would be the benzene feed plus the olefin and catalyst feeds, whereas, the reactants introduced into the subsequent stages would additionally include the alkylation reaction mixture or effluent flowing serially thereinto from the preceding stage. On this basis, a suitable minimum degree of mixing can be expressed as the ratio of the above-defined rates which exceeds about 400.

The alkylation process in accordance with this invention can be carried out at atmospheric pressure or at superatmospheric pressures ranging up to about 100 p.s.i.g. A suitable residence time of the reactants within each stage is between about 3 and 30 minutes. For a multi-stage system employing three alkylation zones or stages, a residence time within each stage from about 15–30 will generally suffice.

The molar ratio of total benzene feed to total olefin feed can be between about 3 and 12. A preferred range of molar ratio of benzene to olefin is from 6–7.

As mentioned previously, the internal molar ratio of benzene to olefin is considerably higher in each stage, particularly the initial stages, than the cumulative ratio selected for the overall process. For example, in the operation of a multi-stage process having three reaction zones and employing overall external ratio of benzene to olefin of 10, the external molar ratio of said reactants will be 30 for the first stage and 15 cumulative for the first two stages provided the total amount of benzene is fed into the first zone and equal quantities of the olefin are introduced into each of the stages. It is incidently mentioned in connection with this illustration that a molar ratio of benzene to olefin of about 10 is about the maximum ratio that can be feasibly used in a conventional continuous process employing one reaction zone.

In order to illustrate further the present invention, reference is had to the accompanying schematic drawing showing an equipment layout for practicing the present process wherein three alkylation stages are used. Specifically, in the drawing, three alkylation reactors 5, 6 and 7 are arranged for serial flow by having the bottoms equipped with effluent outlet lines 8, 9 and 10, respectively, which in turn connect to pumps 11, 12 and 14, respectively. The pumps 11, 12 and 14 are connected to effluent discharge lines 15, 16 and 17, respectively, which convey the effluent to reactors 6, 7 and sludge separator 24, respectively. The temperature of the contents of the various reactors can be conveniently regulated by evaporatively withdrawing a portion of the excess benzene flowing in lines 15, 16 and 17, cooling the benzene by indirect heat exchange with water in cooling units 47, 48 and 49, and recycling the cooled benzene to the reactor from which it was withdrawn. Of course, alternate methods for cooling the contents of the reactors can be used.

The reactors 5, 6 and 7 are provided with olefin storage vessels 25, 26 and 27, as well as enriched sludge storage vessels 28, 29 and 30. The olefin feed vessels 25, 26 and 27 are interconnected with the reactors 5, 6 and 7 by means of valve lines 31, 32 and 33, respectively. Similarly, the enriched sludge vessels 28, 29 and 30 are interconnected with reactors 5, 6 and 7 through valve lines 34, 35 and 36, respectively. The reaction mixture in the reactors are mixed by means of agitators 40, 41 and 42. If a promoter is used in conjunction with an alkylation catalyst, same can be fed into the first reactor 5 via line 44. The reaction effluent flowing from the last reactor 7 is then fed into a sludge separator 24. Crude alkylate is decanted from the separator 24 through line 45. The separated sludge is recovered via line 46. The crude alkylate is then fractionated in a conventional manner by fractionating equipment not shown in the drawing. The rates of the feed stream can be measured by flow rates or other suitable conventional means also not depicted in the drawing.

In order to illustrate further the nature of this invention, the following example is presented. This example, as indicated, is given primarily by way of illustration and accordingly, any enumeration of details contained therein should not be interpreted as a limitation on the invention except as expressed in the appended claims. All parts or ratios are by weight.

EXAMPLE

The principal purpose of this example is to show that the present invention provides a continuous process for the manufacture of detergent alkylates having the prime attributes associated with the batch process for preparing corresponding alkylates. Three basic types of alkyl benzenes were prepared in this comparative illustration using dodecene, tridecene and pentadecene, respectively, as the alkylating agents.

The boiling point characteristics, as determined by ASTM method D-86, of the stated alkylating agents are as follows.

|  | Dodecene, °F. | Tridecene, °F. | Pentadecene, °F. |
| --- | --- | --- | --- |
| I.B.P | 346 | 366 |  |
| 5% | 353 | 374 | 408 |
| 10% | 355 | 376 | 418 |
| 30% | 360 | 379 | 446 |
| 50% | 364 | 381 | 460 |
| 70% | 373 | 385 | 478 |
| 90% | 384 | 393 | 505 |
| 95% | 393 | 402 | 519 |
| FBP |  | 415 | 526 |

Pertinent data relative to the runs employing the multi-stage procedure in accordance with this invention are set forth in the following Table I under the headings A, B and C; whereas, preparation of the corresponding alkylates by means of the batch process are detailed in Runs D, E and F, respectively.

The olefin feed was added in equal amounts to each of the three stages. The enriched catalyst sludge was also added in equal amounts into each of the reaction stages. Internal cooling means was provided in each of the alkylation stages in order to maintain the reaction temperatures observed.

In Runs D, E and F based on the batch process, all of the benzene was initially charged to the alkylation reaction vessel together with the catalyst. The alkylating agent was added at a uniform rate in the various times set forth as the first figure in the entry indicating total residence time. The period listed under each of these times is the extent of post-stirring employed following the addition of the alkylating agent.

The quality of the detergent alkylates made by the process in accordance with this invention and those prepared by the batch process, i.e., type for type, was substantially the same. It can be noted from the data given in Table I that the consumption of raw materials compare favorably for each process. Additionally, the yields realized in the practice of the instant multi-stage process also are comparable to that experienced in employment of the batch process.

The data given in Table II below are typical of a production run for obtaining dodecylbenzene according to the known method for continuous operation. In such an operation, the reactants and catalyst are continuously introduced into a single alkylation zone from which the alkylation products are continuously removed.

*Table II*

Comsumption, #/# dodecylbenzene:
   Benzene _____ 0.570
   Dodecene _____ 0.975
   Catalyst _____ 0.028
Yield, #/# dodecylbenzene:
   Intermediate oil _____ 0.190
   Residue _____ 0.214
   Sludge _____ 0.079

In the preparation of the dodecylbenzene referred to in Table II, the results of raw material consumption and yield can be compared with either Run A or B given in Table I. It is to be particularly noted that the yield figures for dodecylbenzene prepared by the present invention (Run A, Table I) are much superior than that which can be realized by the conventional continuous method of operation. Additionally, the quality of product by this prior art practice was substantially inferior to the comparable type of alkylate made by either the process of this invention or the batch process.

*Table I*

| Run | A | B | C | D | E | F |
| --- | --- | --- | --- | --- | --- | --- |
| Olefin | Dodecene | Tridecene | Pentadecene | Dodecene | Tridecene | Pentadecene |
| Mole Ratio (benzene/olefin) | 11.4 | 10 | 10 | 11.4 | 10 | 10 |
| Temp., °F | 104 | 103 | 108 | 81 | 100 | 100 |
| Total Residence time—min | 30 | 30 | 30 | (51/31) | (30/10) | (30/20) |
| AlCl₃ on Olefin, percent | 1.5 | 4.0 | 5.4 | 1.6 | 4.0 | 5.0 |
| Sludge on Olefin, percent | 100 | 100 | 100 | 100 | 100 | 100 |
| Consumption #/# alkyl benzene: |  |  |  |  |  |  |
|   Benzene | 0.457 | 0.684 | 0.84 | 0.46 | 0.631 | 0.642 |
|   Olefin | 0.786 | 1.082 | 1.284 | 0.816 | 1.195 | 1.265 |
|   AlCl₃ | 0.013 | 0.043 | 0.069 | 0.013 | 0.047 | 0.063 |
| Yield, #/# alkyl benzene: |  |  |  |  |  |  |
|   Intermediate Oil [1] | 0.139 | 0.389 | 0.664 | 0.173 | 0.447 | 0.566 |
|   Residue [2] | 0.086 | 0.194 | 0.132 | 0.053 | 0.198 | 0.147 |
|   Sludge | None | 0.148 | 0.249 | 0.030 | 0.202 | 0.225 |

[1] Alkylate boiling below about the detergent range.
[2] Alkylate boiling above about the detergent range.

Runs designated A, B and C in the above table were made employing a three-stage alkylation method in accordance with this invention as generally described hereinabove in connection with the accompanying drawing. All of the benzene feed was introduced into the first stage.

We claim:

1. An improved process for the manufacture of detergent alkylates which comprises: continuously introducing benzene into a reaction zone constituting the first of at least three of such zones serially communicating with one another and wherein the reactant contents of the individual zones are agitated and maintained at a temperature between about 60 and 150° F.; continuously introducing an alkylating agent selected from the group consisting of a $C_{10}$–$C_{16}$ olefin and a $C_{10}$–$C_{16}$ alkylhalide, together with an effective amount of an alkylation catalyst to each of the reaction zones whereby the aggregate amount of alkylating agent so introduced provides an overall external molar ratio of benzene to alkylating agent of from about 3–12; continuously withdrawing reaction effluent from the last of said zones at a rate so as to provide an average residence time of reactants within each zone of from about 3 to 30 minutes; and recovering a detergent alkylate fraction predominately composed of a mixture of $C_{10}$–$C_{16}$ monosubstituted benzenes from said effluent.

2. An improved process for the manufacture of detergent alkylates which comprises: continuously introducing benzene into a reaction zone constituting the first of three of such zones serially communicating with one another and wherein the reactant contents of the individual zones are agitated and maintained at a temperature between about 60 and 150° F.; continuously introducing an alkylating agent selected from the group consisting of a $C_{10}$–$C_{16}$ olefin and a $C_{10}$–$C_{16}$ alkyl halide, together with en effective amount of an alkylation catalyst to each of the reaction zones whereby the aggregate amount of alkylating agent so introduced provides an overall external molar ratio of benzene to alkylating agent of from about 3–12; and whereby between about 30 and 50 percent of said aggregate amount of alkylating agent is introduced into the first zone and between about 25 and 35 percent of the aggregate amount is respectively introduced into the second and third zones; continuously withdrawing reaction effluent from the last of said zones at a rate so as to provide an average residence time of reactants within each zone of from about 3 to 30 minutes; and recovering a detergent alkylate fraction predominately composed of a mixture of $C_{10}$–$C_{16}$ monosubstituted benzenes from said effluent.

3. An improved process for the manufacture of dodecylbenzene which comprises: continuously introducing benzene to a reaction zone constituting the first of three of such zones serially communicating with one another and wherein the reactant contents of the respective zones are agitated and maintained at a temperature between about 60 and 150° F.; continuously introducing dodecene and an effective amount of a alkylation catalyst to each of the reaction zones whereby the aggregate amount of dodecene so introduced provides an overall molar ratio of benzene to dodecene of from about 3–12; and whereby between about 30 and 50 percent of said aggregate amount of dodecene is introduced into the first zone and between about 25 and 35 percent of the aggregate amount is respectively introduced into the second and third zones; continuously withdrawing reaction effluent from the last of said zones at a rate so as to provide an average residence time of reactants within each zone of from about 3 to 30 minutes and recovering a fraction predominately composed of dodecylbenzene from said effluent.

4. An improved process for the manufacture of tridecylbenzene which comprises: continuously introducing benzene to a reaction zone constituting the first of three of such zones serially communicating with one another and wherein the reactant contents of the respective zones are agitated and maintained at a temperature between about 60 and 150° F.; continuously introducing tridecene and an effective amount of an alkylation catalyst to each of the reaction zones whereby the aggregate amount of tridecene so introduced provides an overall molar ratio of benzene to tridecene of from about 3–12, and whereby between about 30 and 50 percent of said aggregate amount of tridecene is introduced into the first zone and between about 25 and 35 percent of the aggregate amount is respectively introduced into the second and third zones; continuously withdrawing reaction effluent from the last of said zones at a rate so as to provide an average residence time of reactants within each zone of from about 3 to 30 minutes and recovering a fraction predominately composed of tridecylbenzene from said effluent.

5. An improved process for the manufacture of pentadecylbenzene which comprises: continuously introducing benzene to a reaction zone constituting the first of three of such zones serially communicating with one another and wherein the reactant contents of the respective zones are agitated and maintained at a temperature between about 60 and 150° F.; continuously introducing pentadecene and an effective amount of an alkylation catalyst to each of the reaction zones whereby the aggregate amount of pentadecene so introduced provides an overall molar ratio of benzene to pentadecene of from about 3–12, and whereby between about 30 and 50 percent of said aggregate amount of pentadecene is introduced into the first zone and between about 25 and 35 percent of the aggregate amount is respectively introduced into the second and third zones; continuously withdrawing reaction effluent from the last of said zones at a rate so as to provide an average residence time of reactants within each zone of from about 3 to 30 minutes and recovering a fraction predominately composed of pentadecylbenzene from said effluent.

6. An improved process for the manufacture of dodecylbenzene which comprises: continuously introducing benzene to a reaction zone constituting the first of three of such zones serially communicating with one another and wherein the reactant contents of the respective zones are agitated and maintained at a temperature between about 80 and 130° F.; continuously introducing dodecene and an effective amount of an alkylation catalyst to each of the reaction zones whereby the aggregate amount of dodecene so introduced provides an overall molar ratio of benzene to dodecene of from about 6–7, and whereby between about 30 and 50 percent of said aggregate amount of dodecene is introduced into the first zone and between about 25 and 35 percent of the aggregate amount is respectively introduced into the second and third zones; continuously withdrawing reaction effluent from the last of said zones at a rate so as to provide an average residence time of reactants within each zone of from about 15 to 30 minutes, and recovering a fraction predominately composed of dodecylbenzene from said effluent.

7. An improved process for the manufacture of tridecylbenzene which comprises: continuously introducing benzene to a reaction zone constituting the first of three of such zones serially communicating with one another and wherein the reactant contents of the respective zones are agitated and maintained at a temperature between about 80 and 130° F.; continuously introducing tridecene and an effective amount of an alkylation catalyst to each of the reaction zones whereby the aggregate amount of tridecene so introduced provides an overall molar ratio of benzene to tridecene of from about 6–7, and whereby between about 30 and 50 percent of said aggregate amount of tridecene is introduced into the first zone and between about 25 and 35 percent of the aggregate amount is respectively introduced into the second and third zones; continuously withdrawing reaction effluent from the last of said zones at a rate so as to provide an average residence time of reactants within each zone of from about 15 to 30 minutes, and recovering a fraction predominately composed of tridecylbenzene from said effluent.

8. A process in accordance with claim 6 wherein said alkylation catalyst is a sludge complex containing from about 1 to 5 percent added aluminum chloride and wherein the amount of said catalyst is from about 50 to 100 percent of the dodecene.

9. A process in accordance with claim 7 wherein said alkylation catalyst is a sludge complex containing from about 1 to 5 percent added aluminum chloride and wherein the amount of said catalyst is from about 50 to 100 percent of the tridecene.

References Cited by the Examiner

UNITED STATES PATENTS

| | | | |
|---|---|---|---|
| 2,373,031 | 4/45 | Kimberlin | 260—671 |
| 2,459,636 | 1/49 | Fenney | 260—671 |
| 2,559,818 | 7/51 | Hanmer | 260—671 |
| 2,740,807 | 4/56 | Rappen et al. | 260—671 |
| 2,771,496 | 11/56 | Hervert | 260—671 |
| 2,840,594 | 6/58 | Coates et al. | 260—671 |
| 2,859,259 | 11/58 | Stiles | 260—671 |
| 3,104,268 | 9/63 | Kovach | 260—671 |

ALPHONSO D. SULLIVAN, *Primary Examiner.*

PAUL M. COUGHLAN, JR., *Examiner.*